June 28, 1966 W. F. PARRISH ETAL 3,258,529

SYSTEM FOR CANCELLATION OF BACKGROUND INFORMATION
AND SIGNALS RESULTING FROM NON-HOMOGENEITY
CHARACTERISTICS OF A THERMAL IMAGERY TUBE

Filed April 10, 1963 2 Sheets-Sheet 1

WITNESSES:
Bernard R. Gieguey
James F. Young

INVENTORS
William F. Parrish, John W. Dzimianski
and George E. Sonner.
BY John L. Niegoff
ATTORNEY SYSTEM FOR CANCELLATION OF BACKGROUND INFORMATION AND SIGNALS RESULTING FROM NON-HOMOGENEITY CHARACTERISTICS OF A THERMAL IMAGERY TUBE Filed April 10, 1963 2 Sheets-Sheet 2

United States Patent Office 3,258,529
Patented June 28, 1966

3,258,529

SYSTEM FOR CANCELLATION OF BACKGROUND INFORMATION AND SIGNALS RESULTING FROM NON-HOMOGENEITY CHARACTERISTICS OF A THERMAL IMAGERY TUBE

William F. Parrish, Baltimore, John William Dzimianski, Catonsville, and George E. Sanner, Sparks, Md., assignors to Westinghouse Electric Corporation, Pittsburgh, Pa., a corporation of Pennsylvania Filed Apr. 10, 1963, Ser. No. 272,076
2 Claims. (Cl. 178—6.8)

This invention relates to image translation systems and more particularly to systems utilizing a pickup tube and a display tube and means associated with said pickup tube for cancellation of background information and signals resulting from non-homogeneity characteristics of the pickup tube.

More particularly this invention is directed to an image translating system particularly adapted to the infrared spectrum in which a pickup tube is utilized having a radiation sensitive target from which an output signal is derived by means of a scanning electron beam. In this type of system the scanning or reading beam derives a signal from each element of the scanned radiation sensitive target. In the thermicon imaging tube example, one type of signal is that due to variation in the radiation intensity from each scene element which is imaged on the energy sensitive target of the tube and retained until it is interrogated by the reading beam which impresses the signal information, through an appropriate signal channel upon a suitable display system, such as a cathode ray tube, so that areas of varying radiation intensity are displayed on the tube screen corresponding to the electrical signal derived from each element of the pickup tube. The light emission from each element of the display screen is retained during the interval between successive frames by the persistence of the display phosphor of the display screen so that the effect on a suitable light integrating system, such as the human eye, is that of a steady state emission.

It is well known that the responsivity of the scanned target used in thermal image scanning tubes varies from element to element. The same variation is found in other imaging devices such as the vidicon or orthicon. Accordingly, the scanning of the reading beam across these elements will produce a signal due to these variations from element to element of the pickup target and this is usually referred to as non-uniformity dark current. These variations are present at all times even in the absence of a scene and produce undesirable signals on the display screen. These signals may take the form of a mottled or gray appearance which often seriously limits the sensitivity of the pickup tube.

Heretofore, proposals have been made to accomplish the cancellation of extraneous signals due to the non-homogeneities of the photoconductive target as well as those signals due to background radiation. In general, these systems utilize what are commonly referred to as storage cancellation techniques. One such prior art system uses a technique of electronically superimposing inverted signals from one storage frame or raster upon the signals from the succeeding frame. In general, this is accomplished by preventing the radiation from reaching the thermal image scanning tube during alternate frames by use of a synchronized shutter. The non-homogeneity information scanned off during the shuttered period is stored or delayed for one frame period and is then inverted and combined in a difference amplifier with the succeeding frame information. The resulting video information contains only the target signal. The primary disadvantage of the frame cancellation system is due to the inherent long time delay constant which requires delay line having large attenuation which result in substantial loss of signal. Although other feasible memory devices could be used in such a system, the memory devices, such as storage tubes, would require considerable circuitry and expense.

Accordingly, it is a primary object of the present invention to provide an improved system for the cancellation of variation in the uniformity of the elements of the pickup tube while at the same time effectively reducing or eliminating background signal information.

It is a further object to provide an improved system of the type mentioned having an improved signal to noise ratio of the signal derived from an imaging pickup tube.

In accordance with the present invention, in an infrared tracking system utilizing a thermal imaging tube, the target information is obtained by sequentially scanning the sensitive target line by line with an electron beam. The vertical resolution in such systems is inherently determined by the thermal spreading. Accordingly, there is a definite relation between the number of lines that should be scanned per frame in order to obtain the optimum vertical resolution in such tubes. To obtain optimum system response an optical system is used which images the target energy in such a manner that it falls within a spot area, the circle of confusion of which is less than the width of one of the scanning lines. Since there is non-homogeneity information, and possibly target information, between the scan lines which gives the optimum vertical resolution, in accordance with this invention the target is scanned at a rate twice that dictated by thermal spreading. The information obtained from each odd scanning line which includes the non-homogeneity information is delayed for one line period, inverted and combined with the information obtained from the succeeding even line which includes target information. The signals from the odd and even lines of scansion are combined in a difference amplifier so that the non-homogeneity signals cancel leaving only the target signal. The video output of the difference amplifier is gated off during each odd line so that the non-homogeneity information is not passed to the display tube. Accordingly, the information that passes through the difference amplifier is that derived from the even scansion line combined with the inverted signals obtained from the succeeding odd line, thus causing the non-homogeneity signals to be cancelled. The desired target information is then impressed upon the display tube.

The invention itself, however, both as to its organization and method of operation as well as additional objects and advantages will best be understood from the following description when read in connection with the accompanying drawings, in which.

Figure 4:
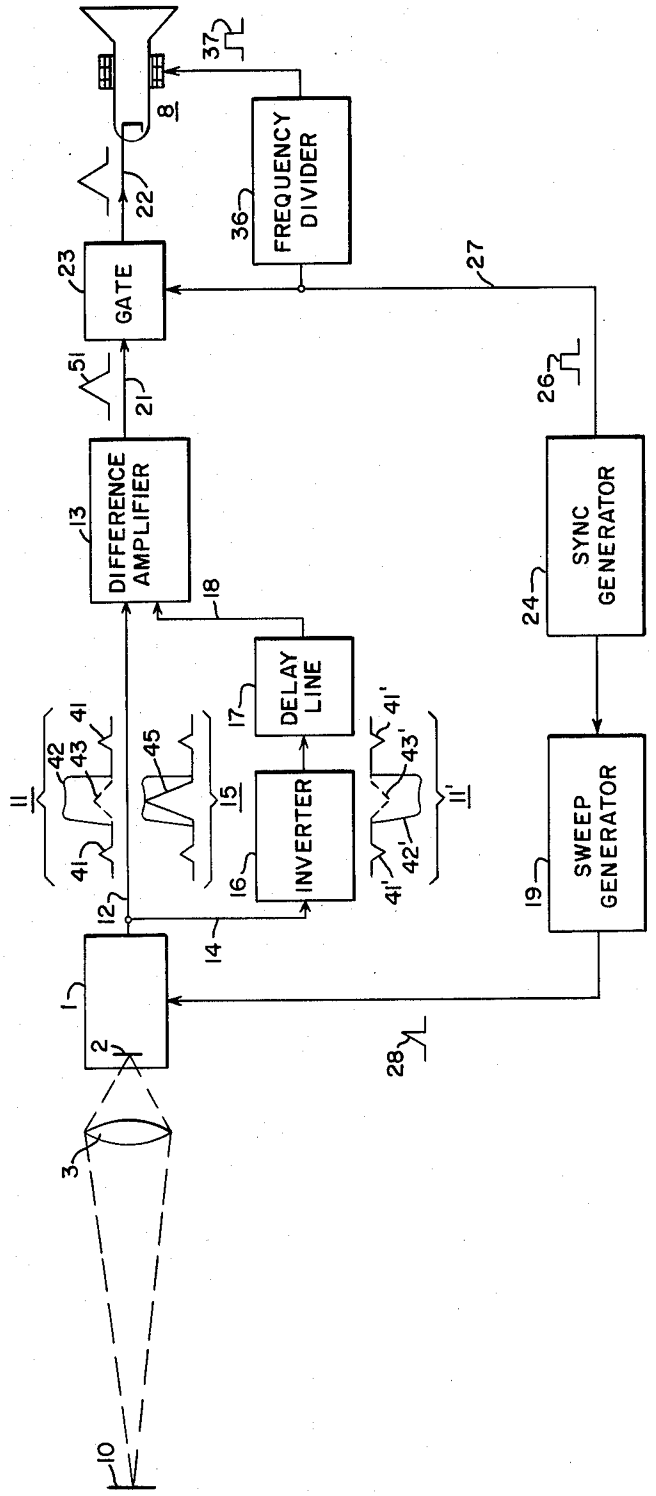
FIG. 4 is a block diagram of the scanning system.

Since the components of the system represented in FIG. 4 are conventional, it is appropriate to proceed with discussion of the special environment in which the components cooperate in accordance with the present invention. In this special cooperative relation the thermal imaging tube, such as the Westinghouse Thermicon, is scanned at a frequency which is above the conventional frequency which is associated with optimum image resolution and wherein the output of the difference or cancelling amplifier is gated at a frequency equal to the difference between the frequency for optimum resolution and the frequency actually used.

Figure 1:
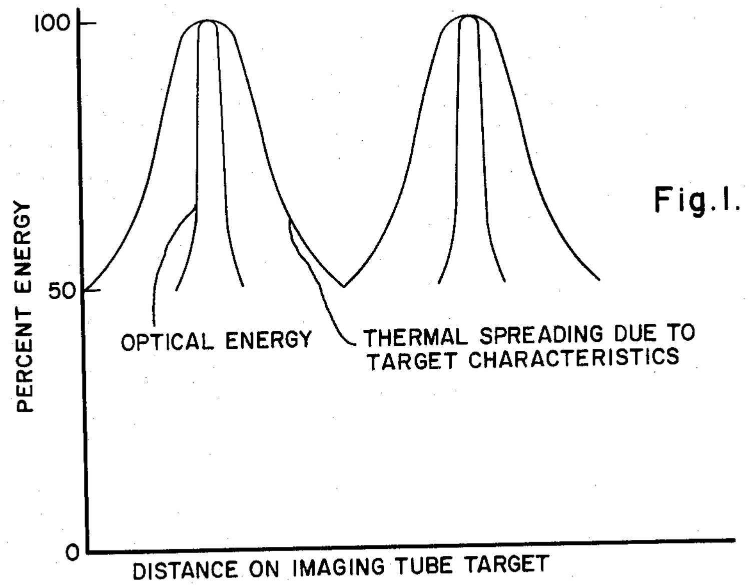
FIGURE 1 is a graphical representation showing the relation between the lateral distance on the imaging tube target and the relative amplitude of the optical energy focussed by the optical system on the target and also indicating the spreading of that energy due to thrmal transfer.

In an infrared tracking system using a thermal image scanning tube, such as tube 1 in FIG. 4, the target information is obtained by sequentially scanning the thermal sensitive photoconductive target 2, line by line, with an electron beam. The vertical resolution or the number of lines that should be scanned horizontally in one frame to get optimum resolution will be determined by thermal spreading. This is illustrated in connection with FIG. 2, where the optical system is represented as focusing a spot of the image within an area on the target illustrated at 4 in an area less in width than the width of the electron scanning beam trace on the target being illustrated at 6. It is apparent that if the optical energy from the target was confined to the spot 4, which corresponds in width to the upper end of the graph labeled optical energy in FIG. 1, the horizontal scanning frequency and, therefore, the horizontal traces on the target 6 could be in juxtaposed relation in order to obtain the optimum resolution. Referring again to FIG. 1, it will be noted that due to thermal spreading, an area of the target much wider than that corresponding to the width of the focused optical energy will be energized by the thermal energy source. This enlarged area is represented by the circle 7 in FIG. 2 and this corresponds to the width of the graph of FIG. 1 labeled thermal spreading due to target. From the above it will be readily seen that if the radiation was ordinary light it would be conventional and desirable to use a scanning frequency which would cause the scanning line traces 6 of the horizontal scanning beam to be substantially adjacent each other. However, due to the thermal spreading of the optical energy in the target when the system is looking at a source of infrared information, it has been conventional to decrease the horizontal scanning frequency in order to provide optimum response. It will be understood, of course, that because of the thermal spreading on the target the use of a horizontal scanning frequency which would cause the target signal horizontal scanning traces to touch each other on the target would not produce additional target information.

Figure 2:
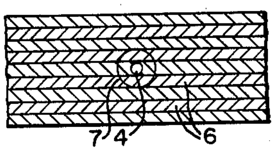
FIG. 2 is a greatly enlarged partial view of the target area showing the general relation between the size of the target signal radiation and the enlargement of the circle of confusion as a result of thermal spreading.
Figure 3:
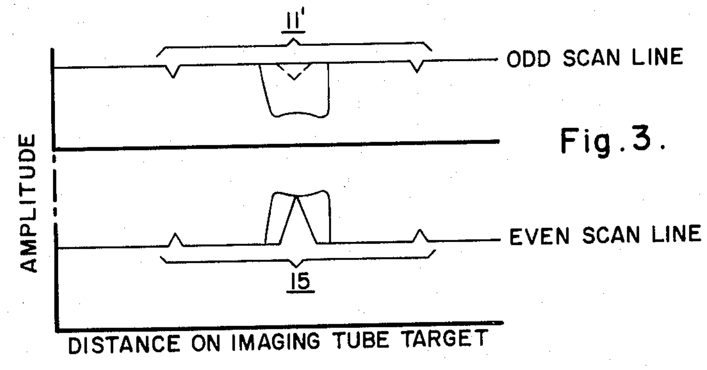
FIG. 3 is a graphical representation of the relation between the position on the imaging tube target of signals from the delayed and inverted odd scan line including target and non-homogeneity information and the signal from the even scan line representing target and non-homogeneity information.

The present invention takes advantage of the fact that the area between the horizontal scanning lines spaced so as to obtain optimum target signal information also contains non-homogeneity information, in addition to possibly some target information. In this system, target signal traces are interleaved with alternate non-homogeneity information traces. The non-homogeneity information is retrieved from the target 2 by scanning horizontally at a rate twice that dictated by the thermal spreading. The effect of this increase in horizontal scanning rate is to cause the horizontal scanning traces to be laid side-by-side in juxtaposed relation as illustrated in FIG. 2.

Since the primary objective of the present invention is to cancel the non-homogeneities of the target as well as to cancel out infrared background, such as clouds and sky background, the signal information from every other line is withheld from the video output cathode ray tube 8 and is utilized to cancel the non-homogeneity and the background information in the horizontal trace which is used for deriving target signal video output signals.

The system of FIG. 4 in operation accomplishes this end result. The optical system 3 focuses the infrared information which it sees on the target 2 of the thermal image scanning device 1. Assuming that there is a target at some great distance, such as at 10 within the aperture of the optical system 3, the information obtained from each odd line beginning with the first line in the frame will contain non-homogeneity information as well as background information and a signal embraced by the bracket 11 will appear on the connection 12 between the thermal image scanning tube 1 and the difference amplifier 13. Obviously, this same signal will also appear on the connection 14 between the scanning tube 1 and the inverter 16. The inverted signal 11′ from inverter 16 is supplied to the delay line 17 where it is delayed and from which it is supplied to the difference amplifier 13 through the connection 18. The parameters of the inverter 16, the delay line 17 and the associated connections 14 and 18, constituting a branch circuit parallel to the connection 12, are so related to the frequency of the sweep generator 19 that the signals appearing on connection 14 are delayed in their arrival over the connection 18 to the difference amplifier 13 by a time interval exactly equal to one horizontal line interval. Accordingly, the same signals that pass directly over the connection 12 between the thermal image scanning tube 1 and the difference amplifier 13 will be inverted and arrive at the difference amplifier 13 over the branch circuit 14, 16, 17 and 18, at an instant in time corresponding to the beginning of the succeeding even scanning lines. Therefore, as the even line starts the inverted signal information derived from the previous odd scanning line will occur in time coincidence so that any non-homogeneity information will be cancelled from the output of the difference amplifier 13 which appears on the connection 21. During the scanning of the odd line traces the connection 22 to the cathode ray tube 8 is disconnected from connection 21 by means of the synchronizing gate 23. During the scanning of the even line traces the cathode ray tube 8 is connected to connection 21 through the gate 23. To accomplish this a sync generator 24 is provided having suitable pulse shaping circuits for producing pulses 26 on connection 27 which supply gating pulses to trigger the period. The sync generator 24 also supplies pulses for synchronizing the sweep generator 19 so that it supplies scanning pulses 28 to the image scanning tube 1 in synchronism with the pulses 26 on the connection 27.

A suitable frequency divider 36 is electrically interposed between the connection 27 and the deflection system of the cathode ray tube 8. The frequency divider 36 supplies deflection pulses 37 to the deflection system of the cathode ray tube 8 which are half the frequency of the pulses 26 on the connection 27. The pulses 26 on the connection 27 alternately close the gate during the odd line traces so that no signal is supplied to the connection 22 during this time interval and opens the gate during the even line trace so that the output signal on connection 21 is applied to connection 22 in synchronism with the sweep pulses 37 supplied to the cathode ray tube 8.

Now assume that the horizontal scanning traces on the thermal image scanning tube 1 during any one frame are approaching the thermal image spreading circle 7 resulting from a target within the aperture of the optical system 3. In such event the first odd scan line which touches the circle 7 will cause an output signal on the connection 12 which will have non-homogeneity information represented by the pips 41 and in addition thereto will have signal information derived from the thermal spreading of the target information represented by the irregular pulse 42. In addition thereto, depending upon the exact relation between the horizontal trace and the position of the target spot 4 on the target 2, there may be a certain amount of target information represented by the dotted line pip 43. During the next even line trace, signals such as those embraced within the bracket 15 and including the target signal pip 45, will be supplied directly to the difference amplifier 13 over connection 18 at the same time that the delayed signal 11′ is supplied to the amplifier over connection 18. It should be repeated here that during the odd line traces the signals appearing on connection 12 will not be supplied to the connection 22 to the cathode ray tube 8. Since the gate between connections 21 and 22 will be open only during the successive even line scans the signals on connection 22 will be those which are the algebraic sum of the signals 15 from the even line scans appearing on connection 12 and the inverted signals 11' from the odd line scans appearing on connection 18.

When the signal on connection 12 and the signal on connection 18 are added algebraically in the difference amplifier 13 during the even scan lines, substantially only signal information represented by the signal pulse 51 will appear at the output connection 21. Since the gate is open during this even scanning trace the same signal 51 will be applied to the input connection 22 to the cathode ray tube 8 and substantially all of the undesired information coming from the non-homogeneity characteristics of the target and background information present within the aperture of the optical system 3 will be cancelled.

It should be readily apparent from the above description that applicants are not limited to the exact arrangement of the components shown in block diagram in FIG. 4. It is essential, of course, that apparatus be provided which will carry out the function as described. For example, it will be readily apparent that the sync generator 24 could be so designed as to have a frequency to produce the proper scanning rate for the cathode ray tube 8 and then a frequency multiplier capable of doubling the frequency could be used to supply the pulses to the gate and to the synchronized sweep generator 19.

While the invention has been shown in one form, it will be obvious to those skilled in the art that it is not so limited, but is susceptible of various changes and modifications without departing from the spirit thereof.

We claim as our invention:

1. An infrared image translation system comprising a thermal image scanning pickup tube having a radiation sensitive target and means for generating and deflecting an electron beam for deriving electrical signals resulting from the scanning of said target when an image is impressed upon said target, said system also including a cathode ray discharge device having a display screen and means for generating and deflecting an electron beam for scanning said display screen, synchronizing means for causing the scanning of the electron beam in said thermal image scanning tube at a frequency equal to twice the frequency of scanning of the electron beam in said display tube, means for inverting and delaying signals resulting from each scanning line by an amount equal to a scanning line interval, means for algebraically summing the inverted signals resulting from selected scanning lines and the uninverted signals resulting from other scannings lines to provide composite signals, and means for supplying certain of said composite signals to said cathode ray display device.

2. An infrared image translation system as set forth in claim 1 wherein the inverted signals from the odd numbered scanning lines are algebraically summed with the uninverted adjacent scanning lines.

References Cited by the Examiner

UNITED STATES PATENTS

| | | | |
|---|---|---|---|
| 2,757,236 | 7/1956 | Bedford | 178—7.5 |
| 2,957,042 | 10/1960 | Gibson et al. | 178—7.1 |
| 3,030,440 | 4/1962 | Schade | 178—6 |

DAVID G. REDINBAUGH, *Primary Examiner.*

J. A. ORSINO, *Assistant Examiner.*